United States Patent [19]

Föhl

[11] Patent Number: 4,509,708
[45] Date of Patent: Apr. 9, 1985

[54] MECHANISM IN ROLL-UP DEVICE FOR SAFETY BELTS IN MOTOR VEHICLES

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 468,978

[22] Filed: Feb. 23, 1983

[30] Foreign Application Priority Data

Feb. 24, 1982 [DE] Fed. Rep. of Germany ....... 3206596

[51] Int. Cl.³ .................... A62B 35/00; B65H 75/48
[52] U.S. Cl. .................................................. 242/107.7
[58] Field of Search ............ 242/107.7, 107.6, 107.12; 280/806, 807, 803; 297/475–480

[56] References Cited

U.S. PATENT DOCUMENTS

| 3,834,646 | 9/1974 | Heath | 242/107.7 |
| 4,108,395 | 8/1978 | Heath | 242/107.7 |
| 4,172,568 | 10/1979 | Yamanashi et al. | 242/107.6 |

FOREIGN PATENT DOCUMENTS

2012560 8/1979 United Kingdom ............ 242/107.7

Primary Examiner—John M. Jillions
Attorney, Agent, or Firm—Yount & Tarolli

[57] ABSTRACT

Mechanism in roll-up devices for safety belts in motor vehicles, where the safety belt which, addressed by one or more danger sensors, can be blocked via a belt shaft, is stressed in tension in the winding-up direction of the belt shaft by the force of a spring, and where, through control gates of plate cams, a locking device for the belt shaft is activated from the rest position against the elastic rolling-up spring force within a small range of rotation of the belt shaft in the pulling direction of the belt shaft. The belt shaft and two plate cams for influencing the locking device are in planet-gear-like functional connection with each other, where the antifriction bearing elements are arranged in a planet-gear-like manner and the belt shaft as well as the two plate cams are designed and arranged in a sun-gear-like and planet-gear-cage-like manner.

14 Claims, 15 Drawing Figures

MECHANISM IN ROLL-UP DEVICE FOR SAFETY BELTS IN MOTOR VEHICLES

BACKGROUND OF THE INVENTION

1. Field of the Invention

The present invention relates to a mechanism in roll-up devices for safety belts in motor vehicles, where the safety belt which, addressed by one or more danger sensors, can be blocked via a belt shaft, is stressed in tension by a spring force in the winding-up direction of the belt shaft, and where, within a short range or rotation of the belt shaft in the pull direction of the safety belt, a locking device for the belt shaft, acting against the elastic winding-up spring force, is made effective by control gates of plate cams.

2. Description of the Prior Art

Safety belts which have an end held by a mechanism for rolling-up and holding the safety belts taut, and used for protecting passengers against injuries. Into this mechanism is built a device which is capable or blocking this mechanism and thereby, also the safety belt, in the event that an extreme acceleration or braking force, which normally occurs in accidents, acts through a built-in danger sensor on the motor vehicle or the motor vehicle passenger.

Safety belts applied as close to the body as possible lead to increased safety against accident injuries. For this reason, safety belt arrangements are equipped with a mechanism which pulls the safety belt against the body. This mechanism serves at the same time for rolling-up the safety belt as far as possible if the safety belt is taken off. As a result a loosely hanging safety belt which impedes persons entering or leaving the vehicle and which can lead to accidents is avoided.

To accomplish the rolling-up function for the safety belt in a safisfactory manner, an appropriate pulling force must be exerted on the safety belt. This is normally effected by a spring element arranged in the rolling-up mechanism. The force action exerted by the spring element propagates via the safety belt and affects the persons protected by the safety belt according to regulations in a disagreeable manner. A reduction of the pulling force by the roll-up mechanism would clearly have a more favorable effect on the person to be protected. Reducing the restoring forces for the safety belt by a corresponding amount, however, would also affect the pulling-back function adversely, usually to an excessive degree.

For this reason, it has become known (U.S. Pat. No. 3,834,646) to make available a sufficiently large pulling-back force for the safety belt as well as to take care that this pulling-back force is made ineffective at times. This is accomplished, for instance, via plate cams which act on a locking device. This locking device is capable of blocking the belt shaft at least against the rolling-up force if corresponding control criteria are fed-in via the plate cams. As a control criterion it is evaluated on what distance the safety belt has traveled from its last-occupied rest position by pulling it out against the restoring force. As a further criterion it is evaluated whether, for instance, the car door is open. The position of the door can be signaled to the control device of the locking mechanism via a flexible cable. An open door is evaluated to cause the locking device to be put out of action in any case, so that the safety belt is rolled up.

SUMMARY OF THE INVENTION

The mechanism according to the invention is based on this state of the art. An object of the present invention is to provide a mechanism for roll-up devices of safety belts in motor vehicles the design of which is simple and cost-saving and which functions reliably and with little maintenance.

With the foregoing and other objects in view, there is provided in accordance with the invention a mechanism in roll-up devices for safety belts for persons in motor vehicles comprising a housing, a belt shaft rotatably supported in the housing, a safety belt wound around the belt shaft, a winding-up spring connected to the belt shaft with sufficient force to wind-up the belt when loose and hold it taut against a person wearing the safety belt, a locking device for the belt shaft activated from the rest position against the force of the winding-up spring within a small range of rotation of the belt shaft in the unwinding direction of the belt shaft, two plate cams having control gates through which the locking device is activated, said belt shaft and said two plate cams for influencing the locking device are connected by force transmitting elements disposed in engagement with surfaces connected with the plate cams and a ratchet wheel in a planetary manner.

Other features which are considered as characteristic for the invention are set forth in the appended claims.

Although the invention is illustrated and described herein as embodied in a mechanism in roll-up devices for safety belts in motor vehicles, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

The mechanism functions with a rewinding device working with a sufficiently large power for the safety belt but is put out of operation if required by blocking the belt shaft. The control function is carried out with as little friction as possible. The bearing resistance can be reduced by antifriction bearings instead of sliding bearings.

The mechanism according to the invention is characterized by the feature that the belt shaft and two plate cams are in functional planetary connection with each other via antifriction bearing elements for influencing the locking device. The antifriction bearing elements are arranged in a planetary manner and the belt shaft as well as the two plate cams are designed and arranged in the manner of a sun and a planet cage.

A mechanism according to these features is characterized by a particularly free run and operational reliability. In particular, an exact switching behavior within small switching excursions is achieved.

While in the state of the art, the plate cams can always be rotated in the same direction via frictional connections to the belt shaft between adjustment stops, the adjustment motion of the plate cams is accomplished in the present invention via antifriction bearing elements, where especially between the sun gears and the planet gear cage a speed reduction takes place if one of the sun gears is stopped. In addition, reversals of the direction of motion are achieved. These circumstances which are specific to planet gear drives can be utilized differently, depending on the requirements, within the scope of the invention.

The mechanism according to the invention is employed so that normally, the lock for the belt shaft is put out of operation by the gates of the plate cam. The safety belt can thus be pulled off from the roll-up mechanism against the force of the roll-up spring and be rewound on the belt shaft by the roll-up spring. If, however, only a predetermined small adjustment travel distance is executed in the pulling-off direction of the belt from a last-occupied rest position of the safety belt, the belt shaft and therefore, of the plate cams, the latter influence the locking device in such manner that the belt shaft and thereby, the safety belt are blocked at least against the direction of the pull of the rolling-up spring.

In the utilization of the mechanism, the advantage is obtained therefrom that the pullback spring can be made strong enough to place the safety belt, for one, tautly against the person to be protected, and also to wind it on the belt shaft if not in use. Nonetheless, the person to be protected can free himself or herself of the contact pressure of the safety belt. This can be achieved by setting the locking device for the belt shaft in operation by a brief and slight loosening of the safety belt in the described manner. Larger loosening excursions of the safety belt, on the other hand, release the lock of the belt shaft.

In one preferred embodiment, the mechanism according to the invention is characterized by the feature that the belt shaft is designed with a bearing cage in the form of a planet cage for the antifriction bearing elements and that the plate cams have annular surfaces or running bearings (races) which act like a sun for the antifriction bearing elements.

According to a variant of this preferred design, the mechanism according to the invention is characterized by the feature that the running bearings (races) of the plate cams, cooperating with the antifriction bearing elements, are arranged axially on both sides of the bearing cage for the antifriction bearing elements, radially formed at the belt shaft. In the present case, the annular surfaces or running bearing (race) diameters at the two plate cams are equal. If one of the plate cams is stopped by a stop limiting its rotary excursion, then the second plate cam is moved in the same direction at twice the moving speed relative to the rotating belt shaft. If none of the plate cams is inhibited by a stop, then all elements rotate in the same directions and at the same speed for kinematic reasons.

According to another variant of the preferred embodiment, the mechanism according to the invention is characterized by the feature that the annular surfaces of the plate cams cooperating with the antifriction bearings and the bearing cage formed at the belt shaft are arranged radially relative to each other. Due to the different diameters of the annular surfaces at the plate cams, a usable reduction ratio between the plate cams is achieved. In addition, a mechanism designed in this manner saves space. Also, favorable conditions are created for the transmission of the control forces.

According to another preferred embodiment, the mechanism according to the invention is characterized by the feature that the belt shaft is designed with a running bearing (race) acting like a sun and one of the two plate cams have a bearing cage for the antifriction bearing elements, and the other plate cam has a running bearing (race) acting in the form of the ring. In this case, different speeds of rotation and directions of rotation are imparted to the plate cams via the rotating belt shaft, depending on which of the two plate cams is held by a stop that may be activated. Through this design, a preferred motion sequence is carried out for kinematic reasons.

Preferably, at least one of the running bearings for the antifriction bearing elements is made elastically deformable, at least in the vicinity of the running bearings. This brings about easy assembly and running without play. The elements can be shaped from suitable plastic materials.

It is advantageous to design the mechanism according to the invention such that the running bearings for the antifriction bearing elements have V-shaped running surfaces. In this case, balls are used as the antifriction bearing elements. Through appropriate inclination of these V-shaped running surfaces, the effective radius can conditionally be varied within limits. The balls are guided in an advantageous manner and in turn guide the plate cams.

For manufacturing reasons and reasons of bearing design, it may also be advantageous to tension the running bearings against each other via a spring element.

However, it is also possible to make the running bearing elements of elastically deformable material.

According to a further embodiment, the mechanism according to the invention is characterized by the feature that at one of the plate cams a control lever is arranged, via which this plate cam can be put into a position for the belt shaft releasing the locking device, in dependence on a control criterion fed to the safety belt roll-up device from the outside. Such a criterion may be fed-in, for instance, if the car door is open. It is assumed then that the safety belt is taken off or will be, and that it is to be rolled up by the safety belt roll-up device. In a simple and operationally reliable manner, the mechanism according to the invention can be developed further by forming the locking device for the belt shaft, acting against the elastic roll-up force, by a ratchet gear and a ratchet pawl controlled via the gates of the plate cams.

Embodiments equipped according to the features of the invention will be described in the following in greater detail.

Shown only incompletely in the drawings is the safety-belt roll-up mechanism itself. As is well known, the latter consists substantially of a belt shaft 1, which is rotatably supported in a housing 2. The belt shaft 1 carries a wound-up safety belt 3. Not shown is a conventional winding-up spring which attempts to roll the safety belt 3 on the belt shaft 1, as well as the blocking mechanism which locks the safety belt 3 via the belt shaft 1 in the event of danger.

As intended, the winding-up spring for the safety belt 3 must be designed so that it is capable of placing the safety belt 3 either tightly on the person to be protected or, in the taken-off condition, to roll it up on the belt shaft 1. This force of the winding-up spring, which acts via the safety belt 3, is often bothersome to the person wearing the safety belt 3. The devices shown in the drawings make it possible to make this restoring force of the winding-up spring ineffective for the person to be protected by suitable measures. This is accomplished respectively by first pulling the safety belt out in a first operation and then permitting the belt to be partially pulled back again by the belt shaft 1 in a second operation for placing it on the body. Thereafter, this safety belt 3 is briefly lifted, i.e. pulled out a short distance, whereby a locking device acts on the belt shaft 1 and thereby intercepts the restoring force of the winding-up spring and makes it ineffective for the person to be protected. It must be ensured that the safety belt sets the locking device in operation only within a small excursion, so that the safety belt 3 does not gird the person to be protected too loosely if the belt shaft 1 is locked.

Figure 1:
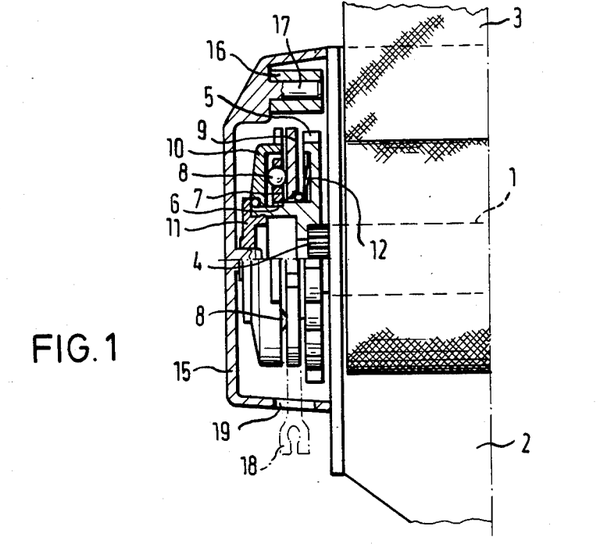
FIG. 1 is a side view in partial axial section of a first embodiment example of mechanism in roll-up devices according to the invention showing a ratchet pawl, a ratchet wheel connected to the belt shaft, a ball in a ball cage and a plate cam on each side of the ball cage.
Figure 2:
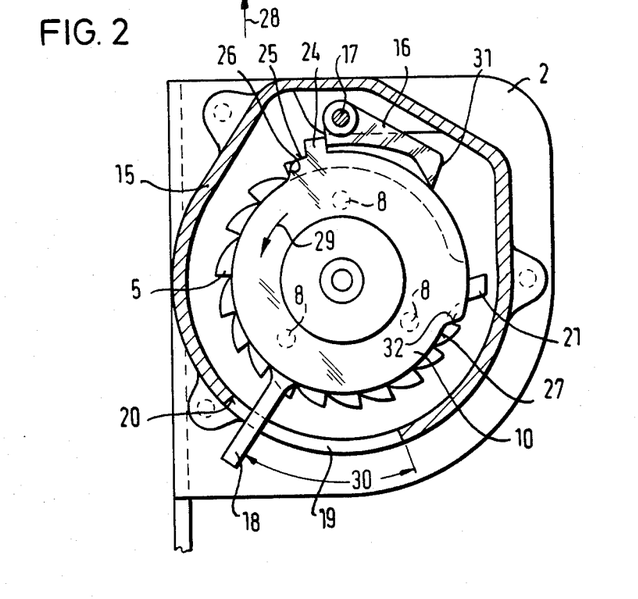
FIG. 2 is a view of this embodiment example in the axial direction with the housing partly cut away, and particularly shows a segment-like recess of the plate cam in which section the ratchet pawl drops into the teeth of the ratchet wheel, and also shows a cutout in the housing cover to limit the angle of rotation by means of a projection from the plate cam.
Figure 3:
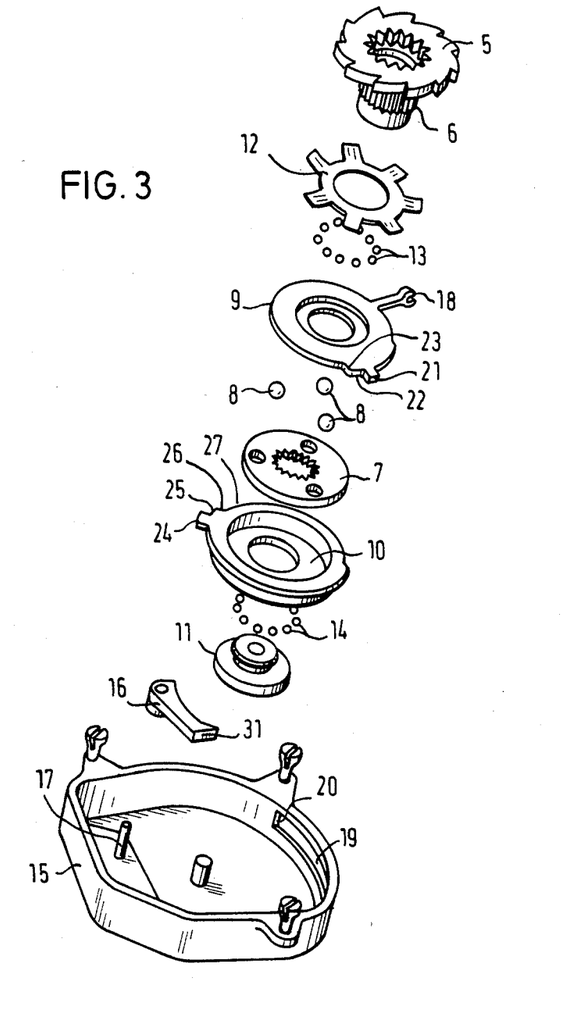
FIG. 3 is a perspective exploded view of this embodiment example.

FIGS. 1 to 3 show such a locking mechanism for the belt shaft 1 in different presentations. An extension with serrations 4 at one free end of the belt shaft 1 engages with its serrations a ratchet wheel 5 and connects the latter firmly to the belt shaft 1. A ball cage 7 is arranged, secured against rotation, on serrations 6 of the ratchet wheel 5. Ball cage 7 has three cut-outs with one of the three balls 8 supported freely, rotatably in each cutout. On both sides of this ball cage 7 are arranged two plate cams 9 and 10 with cam curves and limiting stops. On the shaft of the ratchet wheel 5, the plate cams 9 and 10 as well as the ball cage 7 are held by a closing cover 11. A spring cup 12 pushes, in conjunction with the closing cover 11 via ball bearings 13 and 14, the plate cams 9, 10 against the balls 8. Thereby, a good and low-friction, functional connection is provided between the control elements. A ratchet pawl 16 is pivoted on a pin 17 in a housing cover 15. The tip of the ratchet pawl 16 rests with its own weight on cam contours of the plate cams 9 and 10 and is thereby kept out of engagement with the teeth of the ratchet wheel 5, or it can drop into the teeth of the ratchet wheel 5 if it is released simultaneously by corresponding gate sections of the plate cams 9 and 10.

The plate cam 9 has in the lower portion a driver 18 which extends through a cutout 19 of the housing cover 15 and is limited in one direction of rotation by an edge 20 of this cutout. The plate cam 9 and with it, the locking device can be influenced via this driver 18. The plate cam 9 also has a projecting stop 21 which extends a short distance beyond the effective diameter of the plate cams 9 and 10. Cam sections 22 and 23 in front of this projection 21 keep or swing the ratchet pawl 16 out of the teeth of the ratchet wheel 5.

The plate cam 10 is cup-shaped and has a projecting stop 24. In front of stop 24 is an arc-shaped short gate section 25. This gate section 25 merges via a run-off cam 26 into a segment-like recess 27. This segment-like recess 27 is designed so that the ratchet pawl 16 can drop into the locking teeth of the ratchet wheel 15 only in this predetermined region.

In FIG. 2, the situation may arise wherein a considerable length of the safety belt 3 is pulled out. If the safety belt is wound back again by the winding-up spring, not shown, the entire system rotates counterclockwise synchronously with the belt shaft 1. After an angular distance is traversed, the projecting stop 21 of the plate cam 9 comes to rest at the ratchet pawl face 31. The projecting stop 24 of the plate cam 10 has turned in the meantime in the same direction of rotation by the same angular distance. From this point on, the plate cam 10 rotates, upon further winding-back, with twice the speed of rotation as the belt shaft 1 in the direction of the ratchet face 31, until it comes to a stop. During these operations, the ratchet pawl 16 is kept out of engagement with the teeth of the ratchet wheel 5. The relative rotations of the plate cams 9 and 10 relative to each other take place via ball bearings.

Upon further backward motion, sliding friction now occurs between the plate cams 9, 10 and the balls 8. This sliding friction is very small, however, since the balls which may be of plastic or metal, have a very smooth surface. If now the pulling force of the winding-up spring is not to be transmitted to the person wearing the safety belt 3, then a short length of the safety belt 3 is pulled out of the winding-up device. In the process, the driver 18 comes into contact with the edge 20 of the housing cutout 19 in the already described manner. The segment-like recess 27 of the plate cam 10 is now in the vicinity of the tip of ratchet pawl 16, so that the latter can drop freely into the teeth of the ratchet pawl 15. The belt return, which is normally initiated by the winding-up spring, is stopped, with the result that the safety belt 3 is free of restoring forces.

If the predetermined zone, which is limited by the segment-like recess 27 of the plate cam 10, is exceeded, the ratchet 16 is pushed outward via a transition curve. Thereby, the system is again made passive and it is ensured that the user cannot adjust the safety belt 3 too loosely. For another adjustment, a longer length of the safety belt 3 must again be pulled off the winding-up mechanism, so that after the release of the safety belt 3, the starting position for a new adjustment is again provided.

In this rewound condition, the projecting stop 21 of the plate cam 9 and the projecting stop 24 of the plate cam 10 rest against the ratchet pawl 16. By relocating the stopping edge 20 of the housing cutout 19, the angle of rotation for the driver 18 of the plate cam 9 can be changed. If this angle is reduced, the pull-out distance for the safety belt 3 to the "release" position becomes smaller; if this angle is increased, then also the pull-out distance for the "release" position becomes larger. It is possible to move the stop for the plate cam 10, against which its projecting stop 24 rests, fixed at the housing. Care should be taken that the section 22 of the plate cam 9 is in an overlapping position with the gate section of the plate cam 10 in a small region of rotation, so that the ratchet pawl 16 cannot drop into the teeth of the ratchet wheel 5.

In such design the switching distances when the belt is pulled off into the zero or start position are extremely short due to the passing process of the plate cam 10, and the adjusting functions of the plate cams 9 and 10 relative to each other are effected reliably by the antifriction bearings via the balls 8. In addition, the moving force for the driver 18, which must be supplied, is small since all forcibly moved parts are supported in antifriction bearings in the process of releasing the locking device.

Figure 4:
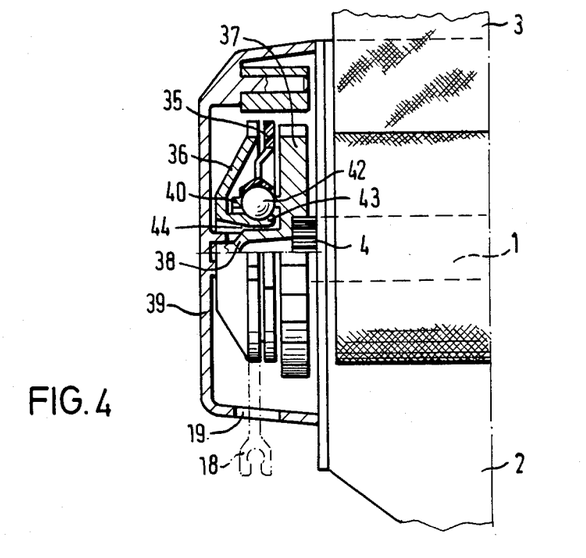
FIG. 4 is a side view in partial section of a second embodiment example which differs from the first embodiment principally in the construction of the plate cams which permit the bearing area to be deformed.
Figure 5:
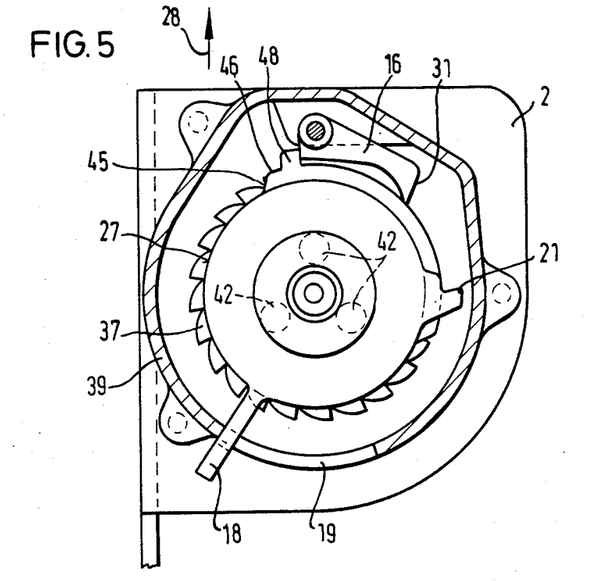
FIG. 5 is a view of this second embodiment example in the axial direction.
Figure 6:
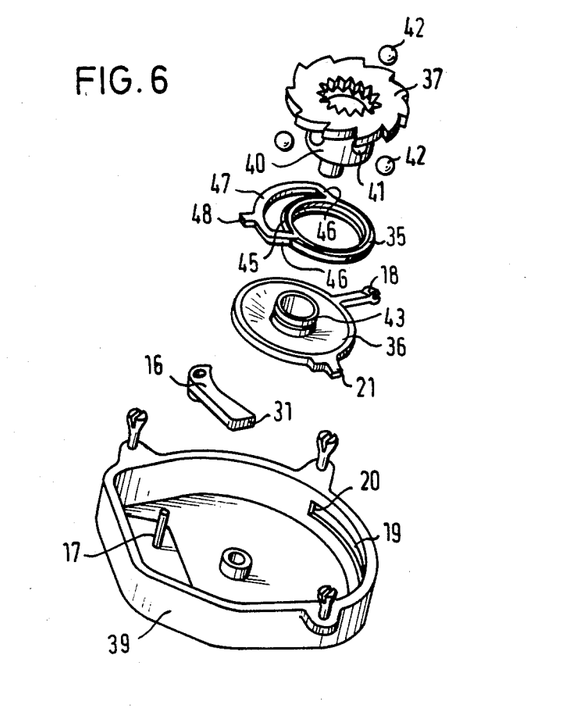
FIG. 6 is a perspective exploded view of this second embodiment example.

A further embodiment example is shown in FIGS. 4 to 6. This embodiment does not differ as to its essential functional features from the previous embodiment example. The plate cam 35 has an outer contour similar to the plate cam 9 and the plate cam 36 is similar to the plate cam 10. The ratchet wheel 37 carries a hub part 38 which is designed in its forward part as a bearing journal and is supported in a bearing neck of the housing. The ratchet wheel 37 has a ring-shaped hub part 40 which has transverse holes 41 for receiving the balls 42.

The plate cam 36 is formed by an inner ring 43 with a bearing track profile. Between this inner ring 43 and the hub part 38 of the ratchet wheel 37, a small amount of radial play is provided. At least the plate cam 35 is made of elastic material. The roof-shaped bearing portion 45 of the plate cam 35 is made with very thin walls since it needs to take up only very small forces. The roof-shaped outer bearing portion 45 is resiliently connected by two small, tangential arms 46 to a bridge-like outer contour 47, from which a driver cog 48 extends. Due to the fact that the running diameter of the roof-shaped bearing portion 45 is made slightly smaller than the normally required ring circle diameter, the system is under continuous preload pressing the bearings 42 against the annular inner ring 43. The bearing area 45 is therefore no longer completely circular but can easily be deformed according to the number of balls into polygonal form (presently, three balls are provided). It is ensured thereby that a small tension is always present which takes care of a reliable transmission of the motion. Due to the two tangentially arranged arms 46 and the uneven division of the number of arms 46 with respect to the number of balls 42 in the ratio 2:3, the system is under a continuous tension.

If the device is not used for an extended period of time, the elastic plastic material is subjected to its tendency to creep. If the device is used, a resilient deformation takes place immediately again, which ensures that the system is always ready for operation. A device constructed according to this embodiment example has few parts and is inexpensive to manufacture, since a snap-on assembly is possible due to the resilient support area 45 of the plate cam 35. Due to the radially guided balls 42, only small adjusting forces are needed. Axial forces do not occur.

Figure 7:
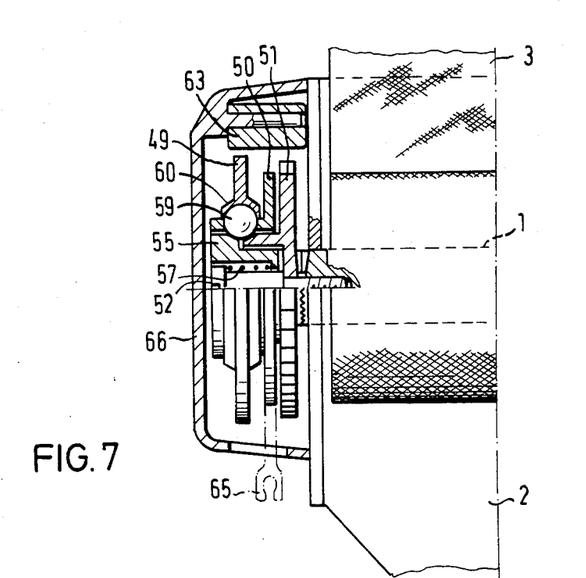
FIG. 7 is a side view in partial section of a third embodiment example in which one cam plate can be held and the other cam plate can rotate at one half the speed of the ratchet wheel.
Figure 8:
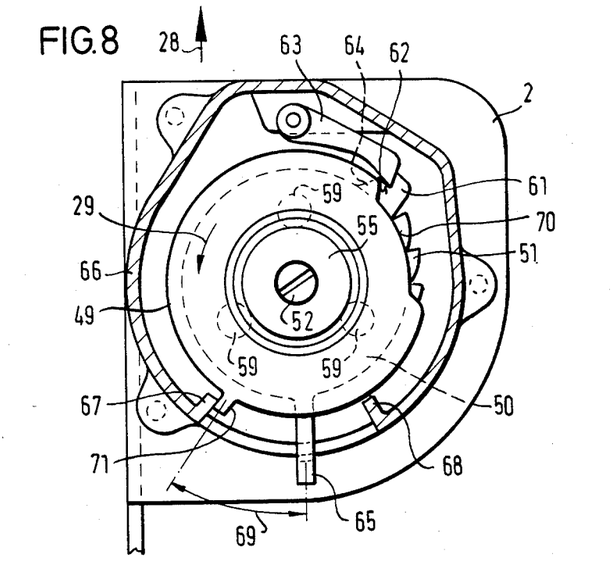
FIG. 8 is a view of this third embodiment example in the axial direction.
Figure 9:
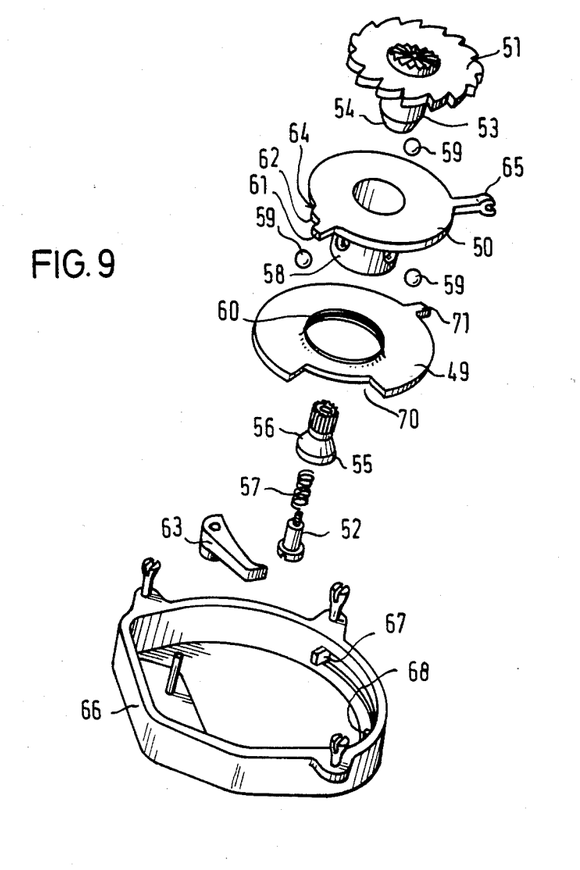
FIG. 9 is a perspective exploded view of this third embodiment example.

A further solution variant is shown in FIGS. 7 to 9. This is a variant in which, by holding one of the plate cams 49, the other plate cam 50 continues to run at half the speed for rotation in the same direction as the ratchet wheel 51 until it comes to a standstill at a stop. From this condition on, the plate cam 49 runs at the same speed of rotation away from its stop but in a direction opposite that of the ratchet wheel 51. This embodiment is particularly advantageous if a system is required which must be returned to its starting position with an overtravel short as compared with the travel setting leading to the loosening of the belt.

The ratchet wheel 51 is connected via an extension with serrations to the belt shaft 1 by an extension screw 52. At the end of the hub 53 of the ratchet wheel 51, an inclined running surface 54 is formed. A thrust piece 55 with an inclined running surface 56 is pushed by the extension screw 52 in the direction of the spool shaft 1 by means of a compression spring 57.

The plate cam 50 has a neck 58 which contains at least three balls 59 with the balls enclosed as in a cage. On top of these balls, the plate cam 49 is formed as an outer race 60.

The thrust piece 55 has longitudinal serrations or teeth, which has its counter-part in the hub part 53 of the ratchet wheel 51. The thrust piece 55 is thereby connected to the ratchet wheel 51 firmly in the direction of rotation and movably in the axial direction.

In FIG. 8, the winding-up device is shown with the safety belt 3 fully wound up. The projecting stop 61 of the plate cam 50 is followed by a short section 62 which is located radially outward so far that the ratchet pawl 63 is held in its inoperative position. Adjacent to this section 62 is a cam section 64 which has a rise to control the ratchet 63 properly. A driver 65 at the plate cam 50 has a rotation-limiting stop 67 in the housing cover 66. The angle of rotation 69 is defined by contact of the projecting stop 61 with the ratchet pawl 63.

The plate cam 49 has a segment-like recess 70 which determines the pulling-out length of the safety belt 3, at which the locking device becomes operative. A projecting stop 71 rests against the housing cover stop 67 and thus provides the starting position of the plate cams 49 and 50 relative to each other for a full excursion angle. If now the belt 3 is pulled out, for instance, in the direction of the arrow 28, then the plate cam 50 moves with one-half a revolution in the same direction as the unwinding of the belt shaft 1. After striking the driver 65 at the stop 67 and further pulling-off of the safety belt 3, the plate cam 49 leaves its position and moves in the direction 29 up to the stop 68 at the housing cover 66. When the safety belt 3 is rewound, the projecting stop 61 returns to the stop of the ratchet pawl 63. At the same time, the plate cam 49 runs at the same speed of rotation in a direction opposite to the rewinding direction until the projecting stop 71 comes to rest at the stop 67. In this operating phase, the ratchet pawl 63 cannot engage the teeth of the ratchet wheel 51.

If now only a short length of the safety belt 3 is pulled off the belt shaft 1, the projecting stop 61 of the plate cam 50 moves so far that the angle of rotation 69 is traversed. Then, the plate cam 49 is rotated in the opposite direction, so that its segment-like recess 70 gets into the region of the ratchet pawl 63 and the latter blocks the ratchet wheel 51 to execute the locking operation. If this segment-like recess 70 is traversed, the ratchet pawl is automatically brought to the outside again. It is ensured thereby that the pull-back force of the winding-up device can be eliminated by the locking mechanism only within a relatively small predetermined zone. Due to the counter-rotating system, a very short amount of rewinding by a few more millimeters than the safety belt 3 had been pulled out maximally is sufficient to bring the system back into its starting position.

By modifying this design, a further variant can be obtained by interchanging the functions of the stops of the plate cams 49 and 50. Thereby the locking device is activated within a greater pulling-out range of the safety belt 3. Only after this greater range is exceeded is the locking device disabled again.

Figure 10:
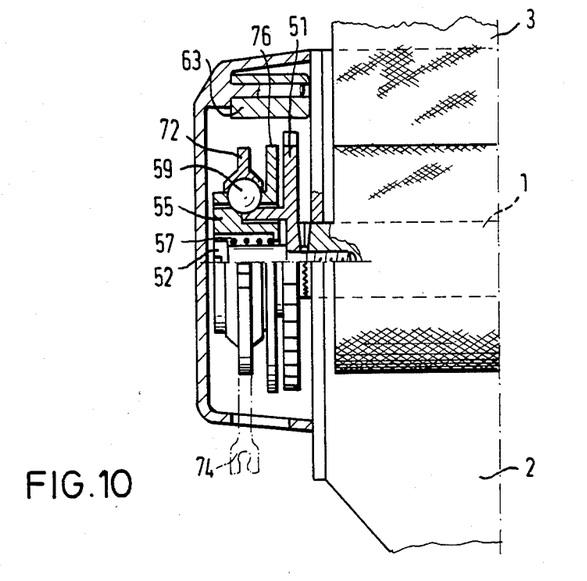
FIG. 10 is a side view in partial section of a fourth embodiment example.
Figure 11:
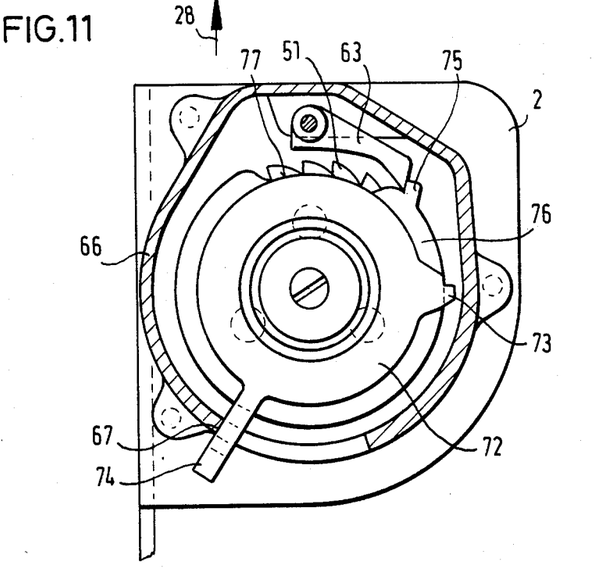
FIG. 11 is a view of this fourth embodiment example in axial direction.
Figure 12:
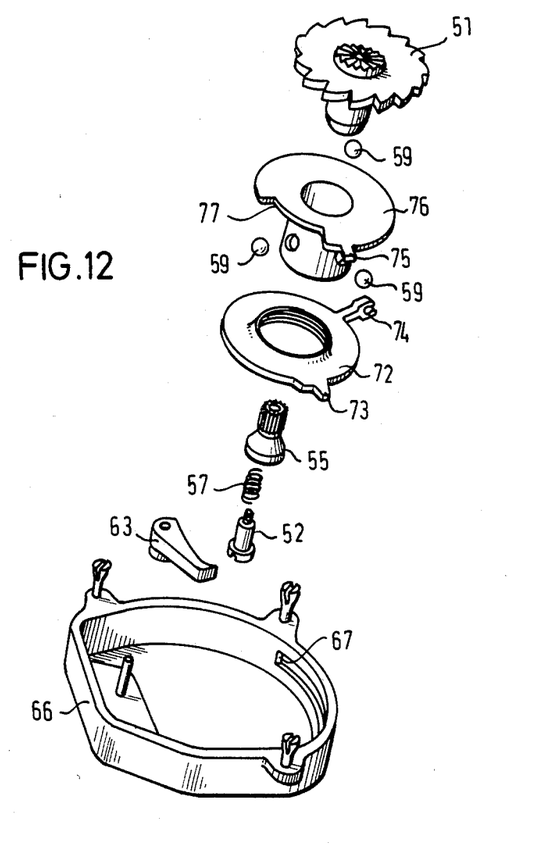
FIG. 12 is a perspective exploded view of this fourth embodiment example.

This embodiment is illustrated by FIGS. 10 to 12. The plate cam 72 now comprises a projecting stop 73 with the corresponding transitions as well as a driver 74.

In the rolled-up condition, this driver 74 rests against the stop 67 of the housing cover 66. The projecting stop 75 of the plate cam 76 has a short section which keeps the ratchet pawl 63 out of engagement with the teeth of the ratchet wheel 51. This region is followed by a control transition which merges into a segment-like recess 77. If the safety belt 3 is pulled off in the direction 28, the plate cam 76 rotates at one-half the speed of rotation in the same direction as the belt shaft 1, until the plate cam comes to rest at the pawl 63. After reaching this position, the plate cam 72 leaves its stop-limited position and rotates against the direction of rotation of the belt shaft 1 up to the contact with the ratchet pawl 16 on the front side. To bring the system into the starting position, a longer pull-back distance must be effected at the safety belt.

After rewinding, the starting position shown prevails again. To activate the locking device, the safety belt 3 is pulled off slightly by the belt shaft 1 in the direction 28. In this process, the plate cam 76 continues to move in the same direction at half the speed of rotation and the segment-like recess 77 releases the ratchet pawl 63, so that the latter can drop into the detent teeth of the ratchet wheel 51. If the maximally predetermined pulling-out length of the safety belt 3 is reached, the ratchet pawl 63 is shifted out again via the control cam of this plate cam 76.

Figure 13:
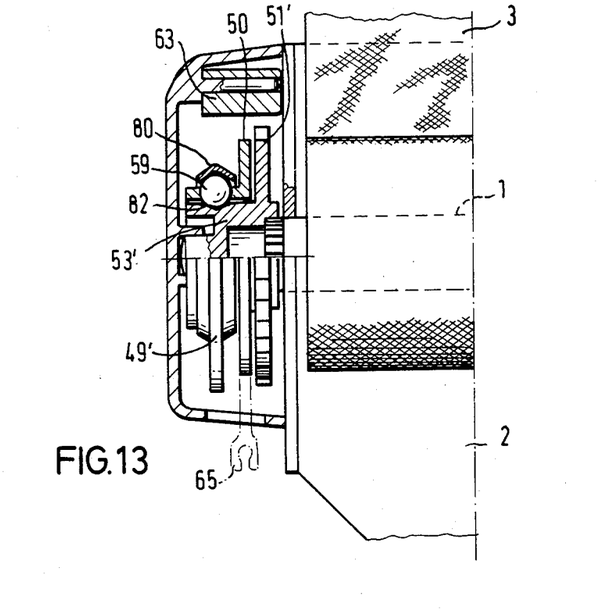
FIGS. 13-15 are a variant of the embodiment example according to FIGS. 10-12.
Figure 14:
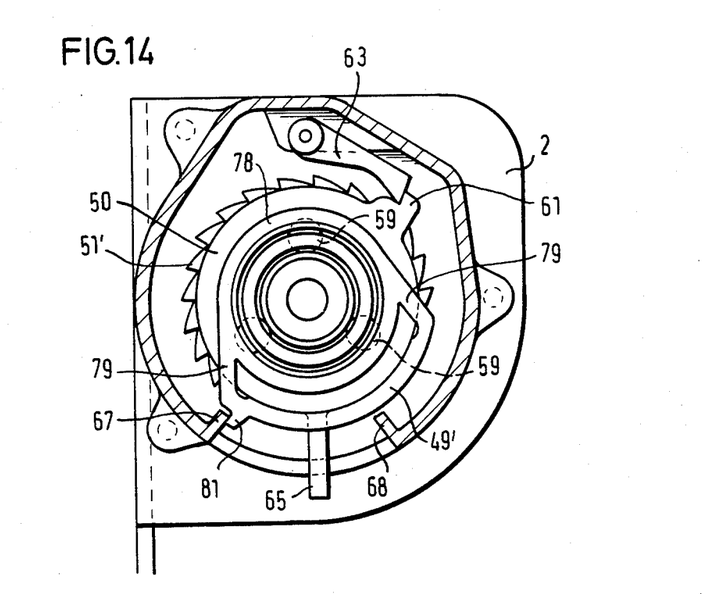
Figure 15:
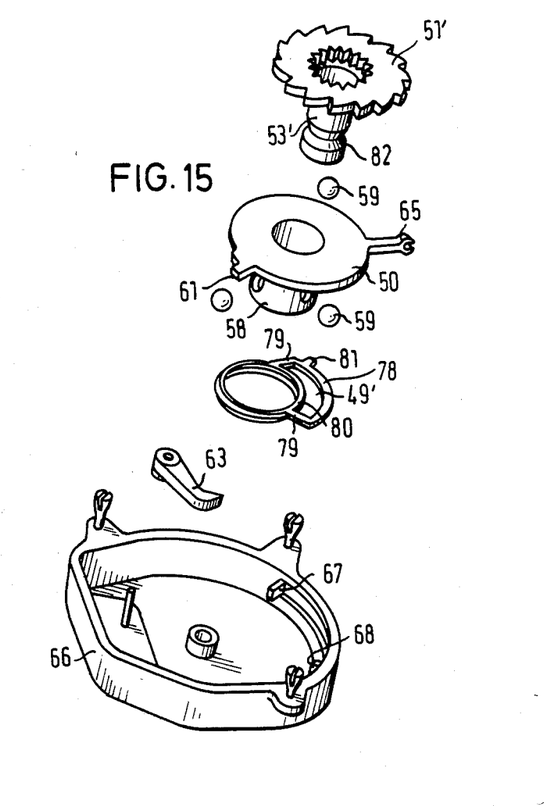

A variant of the above-described embodiment example is shown in FIGS. 13 to 15. The differences are in the mechanical design, especially of the running bearings races for the balls 59. The ratchet wheel 51' has hub 53' and running bearing (race) 82. The appropriately differently designed plate cam 49' has, like the plate cam 36 according to FIGS. 4 to 6, a slightly elastic inner ring with a profiled race, by which the outer race 80 with a flange-like outer contour and a driver cog 81 is formed via two small tangential arms 79. The race for the balls 59 on the hub 53' of the ratchet wheel 51' can be made in one piece. By this design, the manufacturing and assembly costs can be reduced.

I claim:

1. A safety belt retractor assembly comprising a base, a spool rotatably mounted on said base and adapted to be connected with a safety belt, biasing means for urging said spool to rotate in a direction tending to wrap the safety belt around said spool to thereby press the safety belt against an occupant of a vehicle after the safety belt has been connected, and comfort means for holding said spool against rotation under the influence of said biasing means to thereby relieve the pressure applied against the occupant of the vehicle by the connected safety belt, said comfort means including a ratchet wheel which is connected with said spool for rotation therewith, a pawl which is connected with said base and is movable between an engaged position engaging said ratchet wheel to hold said spool against rotation under the influence of said biasing means and a disengaged position in which said pawl is ineffective to hold said spool against rotation, first and second coaxial cam means rotatable between a blocking orientation in which at least one of said first and second cam means is effective to maintain said pawl in a disengaged position and a nonblocking orientation in which said first and second cam means are ineffective to maintain said pawl in a disengaged position, stop means for limiting rotation of said first cam means in one direction relative to said base, and means for rotating at least one of said first and second cam means from a blocking orientation to a nonblocking orientation in response to withdrawal of a short length of the safety belt from said spool, said means for rotating at least one of said first and second cam means including a plurality of rotatable force transmitting elements having spherical outer side surfaces disposed in engagement with said first cam means, and means for rolling the spherical side surfaces of said force transmitting elements along said first cam means while said stop means prevents rotation of said first cam means in the one direction.

2. An assembly as set forth in claim 1, wherein said means for rolling said spherical side surfaces of said force transmitting elements along said first cam means includes means for rolling said force transmitting elements along said first cam means in the one direction to rotate said second cam means in the one direction at a rate which is twice as great as the rate of rotation of said spool during at least a portion of the withdrawal of the short length of safety belt from said spool.

3. An assembly as set forth in claim 1 wherein said means for rolling said spherical side surfaces of said force transmitting elements along said first cam means includes means for rolling said force transmitting elements along said first cam means in the one direction to rotate said second cam means in the one direction at a rate which is one half as great as the rate of rotation of said spool during at least a portion of the withdrawal of the short length of safety belt from said spool.

4. An assembly as set forth in claim 1 further including means for effecting sliding movement between the spherical side surfaces of said force transmitting elements and at least one of said cam means during at least a portion of the withdrawal of a long length of the safety belt from said spool.

5. An assembly as set forth in claim 1 further including cage means connected with said ratchet wheel and spool for rotation therewith, said force transmitting elements being rotated by said cage means about the axis of rotation of said spool upon rotation of said spool.

6. An assembly as set forth in claim 1 further including cage means connected with said second cam means for rotation therewith, said force transmitting elements being rotated by said cage means about the axis of rotation of said spool upon rotation of said second cam means.

7. An assembly as set forth in claim 1 further including resiliently deflectable surface means connected with one of said cam means for pressing the outer surfaces of said force transmitting elements against an annular surface connected with said second cam means for rotation therewith.

8. An assembly as set forth in claim 1 further including resiliently deflectable surface means connected with one of said cam means for pressing the outer surfaces of said force transmitting elements against an annular surface connected with said ratchet wheel for rotation therewith.

9. A safety belt retractor assembly comprising a base, a spool rotatably mounted on said base and adapted to be connected with a safety belt, biasing means for urging said spool to rotate in a direction tending to wrap the safety belt around said spool to thereby press the safety belt against an occupant of a vehicle after the safety belt has been connected, and comfort means for holding said spool against rotation under the influence of said biasing means to thereby relieve the pressure applied against the occupant of the vehicle by the connected safety belt, said comfort means including a ratchet wheel which is connected with said spool for rotation therewith, a pawl which is connected with said base and is movable between an engaged position engaging said ratchet wheel to hold said spool against rotation under the influence of said biasing means and a disengaged position in which said pawl is ineffective to hold said spool against rotation, first and second rotatable cam means disposed in a coaxial relationship with said ratchet wheel for releasing said pawl for movement from a disengaged position to an engaged position in response to withdrawal of a short length of the safety belt from said spool after the safety belt has been connected, a first annular surface connected with said first cam means and disposed in a coaxial relationship with said ratchet wheel, a second annular surface facing said first annular surface and connected with said second cam means, a plurality of rotatable force transmitting elements disposed between said first and second annular surfaces and having circular outer side surfaces engaging said first and second annular surfaces, cage means for holding said force transmitting elements in a circular array, said cage means being connected with said ratchet wheel for rotation therewith, said cage means being rotatable by said ratchet wheel relative to said first cam means during withdrawal of at least a portion of the short length of safety belt from the spool to roll the circular side surface of said force transmitting elements along said first annular surface and rotate said second cam means relative to said first cam means and said cage means under the influence of forces transmitted to said second cam means by said force transmitting elements to thereby change the relative positions of said first and second cam means.

10. An assembly as set forth in claim 9 wherein one of said annular surfaces is resiliently deflected by engagement with said force transmitting elements to press said force transmitting elements against the other one of said annular surfaces.

11. An assembly as set forth in claim 9 wherein said cage means is rotatable by said ratchet wheel during withdrawal of a portion of the short length of safety belt from the spool to simultaneously rotate said first and second cam means relative to said pawl with said cage means under the influence of forces transmitted from said cage means to said first and second cam means by said force transmitting elements.

12. A safety belt retractor assembly comprising a base, a spool rotatably mounted on said base and adapted to be connected with a safety belt, biasing means for urging said spool to rotate in a direction tending to wrap the safety belt around said spool to thereby press the safety belt against an occupant of a vehicle after the safety belt has been connected, and comfort means for holding said spool against rotation under the influence of said biasing means to thereby relieve the pressure applied against the occupant of the vehicle by the connected safety belt, said comfort means including a ratchet wheel which is connected with said spool for rotation therewith, a pawl which is connected with said base and is movable between an engaged position engaging said ratchet wheel to hold said spool against rotation under the influence of said biasing means and a disengaged position in which said pawl is ineffective to hold said spool against rotation, first and second rotatable cam means disposed in a coaxial relationship with said ratchet wheel for releasing said pawl for movement from a disengaged position to an engaged position in response to withdrawal of a short length of the safety belt from said spool after the safety belt has been connected, a first annular surface connected with said first cam means and disposed in a coaxial relationship with said ratchet wheel, a second annular surface facing said first annular surface and connected with said ratchet wheel, a plurality of rotatable force transmitting elements disposed between said first and second annular surfaces and having circular outer side surfaces engaging said first and second annular surfaces, cage means for holding said force transmitting elements in a circular array, said cage means being connected with said second cam means for rotation therewith, said second annular surface being rotatable by said ratchet wheel during the withdrawal of a portion of the short length of safety belt from the spool to roll the circular side surface of said force transmitting elements along said first annular surface and rotate said cage means and second cam means relative to said first cam means under the influence of forces transmitted to said second cam means from said second annular surface by said force transmitting elements to thereby change the relative positions of said first and second cam means.

13. An assembly as set forth in claim 12 wherein one of said annular surfaces is resiliently deflected by engagement with said force transmitting elements to press said force transmitting elements against the other one of said annular surfaces.

14. An assembly as set forth in claim 12 wherein said second annular surface is rotatable by said ratchet wheel during withdrawal of a portion of the short length of safety belt from the spool to rotate said force transmitting elements relative to said cage means to rotate said first cam means relative to said second cam means under the influence of forces transmitted from said second annular surface to said first annular surface by said force transmitting elements.

* * * * *